(12) United States Patent
Montano et al.

(10) Patent No.: US 7,730,698 B1
(45) Date of Patent: Jun. 8, 2010

(54) SPLIT CRIMPER FOR HEAT SEALING PACKAGING MATERIAL

(76) Inventors: Louis M. Montano, 9628 Sheffield Rd., Perrysburg, OH (US) 43551; Larry E. Smith, 29521 Bates Rd., Perrysburg, OH (US) 43551

( * ) Notice: Subject to any disclaimer, the term of this patent is extended or adjusted under 35 U.S.C. 154(b) by 0 days.

(21) Appl. No.: 11/305,746

(22) Filed: Dec. 16, 2005

Related U.S. Application Data

(60) Provisional application No. 60/636,468, filed on Dec. 16, 2004.

(51) Int. Cl.
B65B 51/16 (2006.01)
(52) U.S. Cl. .............. 53/374.2; 53/374.4; 100/328; 156/581; 156/582; 219/244; 493/205; 493/208
(58) Field of Classification Search ........... 53/371.2, 53/371.4, 371.8, 374.2, 374.4, 374.8, 552, 53/371.5, 374.5; 493/208, 205, 197; 100/328, 100/320; 156/581, 582, 583.2, 583.7, 583.9; 219/243, 244
See application file for complete search history.

(56) References Cited

U.S. PATENT DOCUMENTS

| | | | | |
|---|---|---|---|---|
| 1,937,501 A | * | 12/1933 | Aldrich | 53/135.3 |
| 1,944,147 A | * | 1/1934 | Aldrich | 53/482 |
| 2,200,971 A | * | 5/1940 | Sonneborn et al. | 53/410 |
| 2,354,989 A | * | 8/1944 | Fusco | 53/371.2 |
| 2,434,657 A | * | 1/1948 | Irmscher | 156/494 |
| 2,837,883 A | * | 6/1958 | Bracey | 53/552 |
| 2,966,021 A | * | 12/1960 | Lane et al. | 53/552 |
| 3,045,403 A | * | 7/1962 | Mitchell | 53/74 |
| 3,061,989 A | * | 11/1962 | Newell et al. | 53/552 |
| 3,436,894 A | * | 4/1969 | Sorensen | 53/478 |
| 3,522,689 A | * | 8/1970 | Wylie et al. | 53/552 |
| 3,538,676 A | * | 11/1970 | Barabas et al. | 53/552 |
| 3,625,802 A | * | 12/1971 | Schniepp | 156/546 |
| 3,627,617 A | * | 12/1971 | Schaumburg et al. | 156/566 |
| 3,874,976 A | * | 4/1975 | MacFarland, Jr. | 156/515 |
| 3,902,954 A | * | 9/1975 | Lotto | 156/510 |
| 3,943,686 A | * | 3/1976 | Crawford et al. | 53/371.4 |
| 4,057,951 A | * | 11/1977 | Schneider | 53/55 |
| 4,102,111 A | * | 7/1978 | Nack et al. | 53/552 |
| 4,128,451 A | * | 12/1978 | Sorce et al. | 219/244 |
| 4,254,601 A | * | 3/1981 | Prager et al. | 53/133.8 |
| 4,265,074 A | * | 5/1981 | Reuter et al. | 53/551 |
| 4,288,968 A | * | 9/1981 | Seko et al. | 53/550 |
| 4,444,613 A | * | 4/1984 | Burmeister | 156/446 |
| 4,512,138 A | * | 4/1985 | Greenawalt | 53/451 |
| 4,682,976 A | * | 7/1987 | Martin et al. | 53/133.8 |
| 4,750,313 A | * | 6/1988 | Kammler et al. | 53/451 |
| 4,807,426 A | * | 2/1989 | Smith | 53/550 |
| 4,889,522 A | * | 12/1989 | Gietman, Jr. | 493/193 |
| 4,909,016 A | * | 3/1990 | Rentmeester et al. | 53/374.4 |
| 4,949,846 A | * | 8/1990 | Lakey | 206/484 |
| 5,056,295 A | * | 10/1991 | Williams | 53/450 |
| 5,131,213 A | * | 7/1992 | Shanklin et al. | 53/477 |

(Continued)

Primary Examiner—Stephen F Gerrity
(74) Attorney, Agent, or Firm—Harrity & Harrity, LLP

(57) ABSTRACT

A split crimper for use in a crimping assembly for engaging and heat sealing overlapping layers of a packaging material includes a first crimper portion having a crimping surface and a second crimper portion that is secured to the first crimper portion to form a crimper. Portions of the first and second crimper portions cooperate to define an interior cavity, and a heating element is disposed completely within the interior cavity.

13 Claims, 6 Drawing Sheets

U.S. PATENT DOCUMENTS

| | | | |
|---|---|---|---|
| 5,451,288 A * | 9/1995 | Smith et al. | 219/243 |
| 5,775,055 A * | 7/1998 | Giacomelli et al. | 53/371.2 |
| 6,178,726 B1 * | 1/2001 | Takigawa | 53/451 |
| 6,665,999 B1 * | 12/2003 | Dierl et al. | 53/133.4 |
| 6,736,182 B2 * | 5/2004 | Smith et al. | 156/581 |
| 6,739,370 B2 * | 5/2004 | Melheim | 156/581 |
| 6,877,296 B2 * | 4/2005 | Kohl et al. | 53/451 |

\* cited by examiner

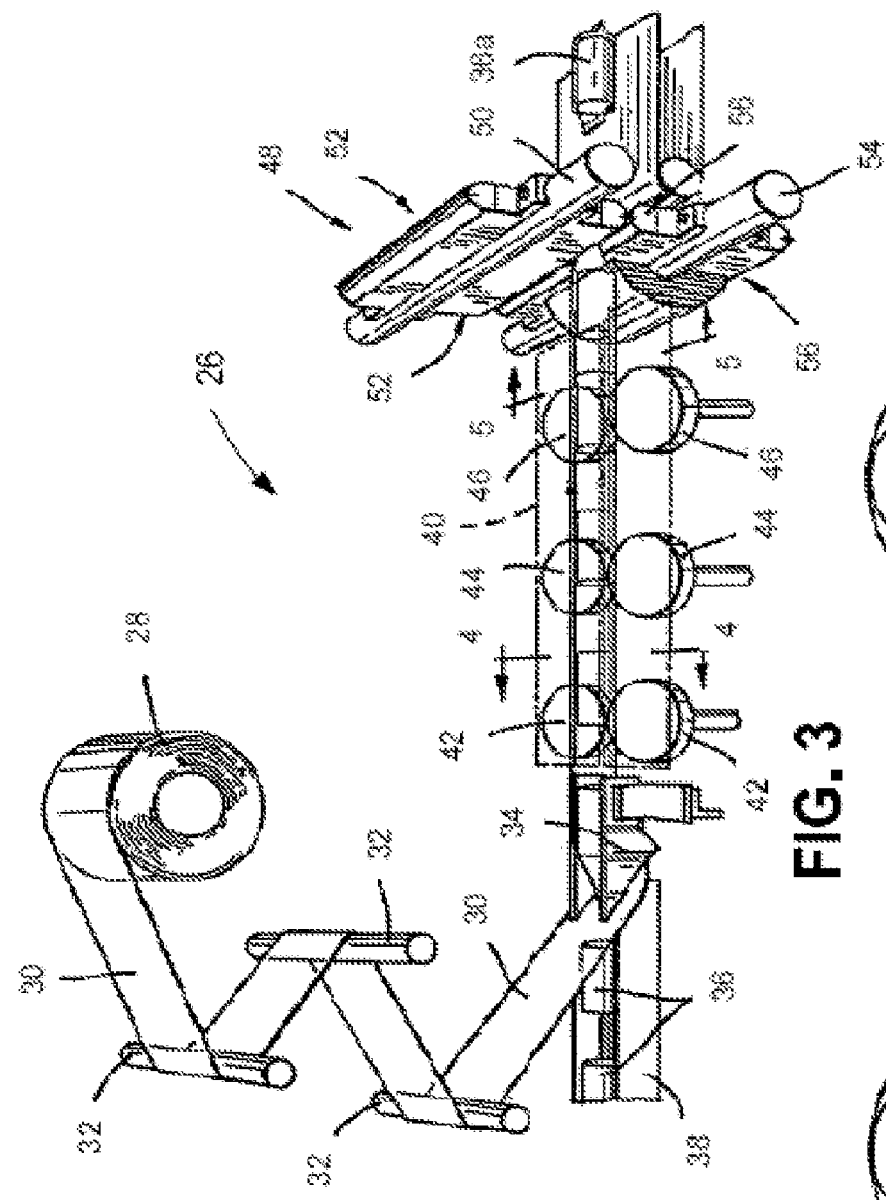

SPLIT CRIMPER FOR HEAT SEALING PACKAGING MATERIAL

CROSS-REFERENCE TO RELATED APPLICATIONS

This application claims the benefit of U.S. Provisional Application No. 60/636,468, filed Dec. 16, 2004, the disclosure of which is incorporated herein by reference.

BACKGROUND OF THE INVENTION

This invention relates in general to form, fill, and seal packaging machinery of the type in which a continuous sheet of a packaging material is sequentially folded about a series of articles to be packaged, sealed about the articles, and cut into individually sealed packages. More specifically, this invention pertains to an improved crimper for heat sealing overlapping end portions of the sheet of packaging material after it is folded about an article.

The formation of a plurality of individually sealed packages of articles using a single continuous sheet of a packaging material is well known in the art. Briefly, the sheet of packaging material is initially passed through a folding mechanism, which continuously folds the film over on itself to form an enclosure for a series of spaced apart articles. The overlapping portions of the film are then sealed along a continuous longitudinal seal. Next, the folded sheet of packaging material is fed to a sealing and cutting assembly that seals the leading and trailing edges of the package to be formed about the enclosed article and cuts the tube into a plurality of individually sealed packages. In some instances, it is desirable to apply heat during the process of sealing the overlapping portions of packaging material. Packages produced by this form, fill, and seal process are commonly used for snack bars, candy, cereals, and the like, as well as for other non-food articles.

The sealing of the overlapping end portions of the sheet of packaging material is frequently accomplished by a mechanical crimping assembly. A conventional mechanical crimping assembly includes a pair of opposed crimpers that are disposed on opposite sides of the overlapping portions of the sheet of packaging material. The crimpers can include one or more heating elements to provide heat during the sealing process. The crimpers have undulating or serrated crimping surfaces defined by adjacent peaks and valleys. When the opposed crimpers are moved into engagement with the overlapping portions of the sheet of packaging material, the peaks of the first crimping surface are aligned with the valleys of the second crimping surface, and vice versa. Such engagement compresses the overlapping portions of the sheet of packaging material to form an intermeshing seal pattern.

During the crimping and sealing process, it is important that the crimpers exert a sufficient amount of force to compress the overlapping portions of the sheet of packaging material. If an insufficient amount of force is exerted by the crimpers, then the overlapping portions of the sheet of packaging material will not be compressed sufficiently to form a complete seal. At the same time, however, it is equally important that the amount of force exerted by the crimpers not exceed the strength of the sheet of packaging material. If an excessive amount of force is exerted by the crimpers, the sheet of packaging material will tear or break. Thus, it is desirable that the amount of force which can be exerted by the crimpers against the overlapping portions of the sheet of packaging material remain within a predetermined range to insure a complete and secure seal.

The distance between the opposed crimpers on the crimping assembly determines the amount of force exerted by the crimpers against the overlapping portions of the sheet of packaging material. In order to insure that the amount of force exerted by the crimpers remains within the predetermined desired range, the set-up of the crimpers on the crimping assembly must be performed very carefully. As a result, the set-up is a very time consuming operation.

It has been found that the heating element and the wires attached thereto are relatively fragile and are prone to failure. In the past, replacement of these components required removal of the crimper from the crimping assembly. This was relatively expensive process because of the set-up time required to replace the crimper on the crimping assembly. Sometimes, replacement of these components required replacement of the entire crimper, which incurred both the set-up time expense and the cost of the new crimper.

Recently, a crimper has been developed which does not require complete removal from the crimping assembly to replace the heating element. As shown in FIGS. 1 and 2, this crimper 10 includes a base 12 that is mounted on the crimping assembly and a top 14 that is removably attached to the base 12 with threaded fasteners 15. Respective grooves 16 and 18 are provided in the top 14 and the base 12 that define a bore 20 that extends longitudinally therethrough. A conventional heating element 22 (shown in FIG. 2) is disposed within the bore 20. The end of the heating element 22 is exposed at the opening of the bore 20, inasmuch as it is not protectively covered by any portion of the top 14 of the crimper 10. Electrical wires 24 attached to the end of the heating element 22 extend outside the bore 20. When it is necessary to replace the heating element 22, the top 14 is removed from the base 12, the heating element 22 is replaced, and then the top 14 is re-attached to the base 12. During this process, the base 12 remains mounted on the crimping assembly so that it is not necessary to perform a relatively time-consuming set-up operation after replacing the heating element 22. Unfortunately, the single heating element 22 in this crimper design does not always provide sufficient heat during a sealing operation. Another drawback is that the relatively fragile junction between the electrical wires 24 and the heating element 22 is left exposed in this design, as discussed above. Thus, it would be desirable to provide an improved structure for a crimper that addresses these drawbacks, while still avoiding the requirement for a relatively time-consuming set-up operation.

SUMMARY OF THE INVENTION

This invention relates to an improved structure for a split crimper that is adapted for use in a crimping assembly for engaging and heat sealing overlapping layers of a packaging material. The crimper includes a first crimper portion having a crimping surface and a second crimper portion that is secured to the first crimper portion to form a crimper. Portions of the first and second crimper portions cooperate to define an interior cavity, and a heating element is disposed completely within the interior cavity.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a schematic perspective view of a form, fill, and seal apparatus for packaging articles including a rotary crimping assembly in accordance with this invention.

FIG. 4 is an enlarged sectional elevational view of a portion of the form, fill, and seal apparatus taken along line 4-4 of FIG. 3, showing the sheet of film partially wrapped about an article.

FIG. 5 is an enlarged sectional elevational view of a portion of the form, fill, and seal apparatus taken along line 5-5 of FIG. 3, showing the sheet of film fully wrapped about the article, but prior to being sealed and cut into individually sealed packages.

DETAILED DESCRIPTION OF THE INVENTION

Figure 1:
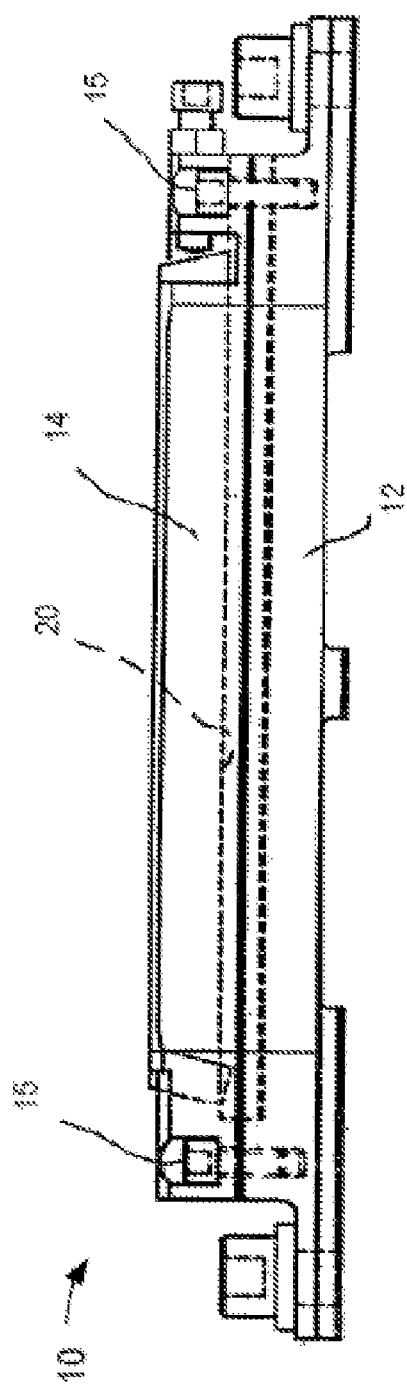
FIG. 1 is a side elevational view of a prior art heated crimper for use in a crimping assembly.

Referring to the drawings, there is schematically illustrated in FIG. 3 a form, fill, and seal apparatus, indicated generally at 26, in accordance with this invention. The apparatus 26 is generally conventional in the art, and only those portions that are necessary for a complete understanding of this invention will be explained in detail. The apparatus 26 includes means for supporting a roll 28 of a conventional packaging material, such as polypropylene films, saran films, or laminations of a plurality of films. A sheet 30 of the packaging material is payed out from the roll 28 and fed around various rollers 32 to a folding shoe 34. The folding shoe 34 is conventional in the art and is provided to continuously fold the longitudinal edges of the sheet 30 of packaging material about the sides of a plurality of articles 36 that are moved longitudinally along a conveyor 38. The folded sheet 30 of packaging material is then moved along a support surface 40.

As the folded longitudinal edges of the sheet 30 are moved along the support surface 40, they are engaged by a pair of folding rollers 42 disposed beneath the support surface 40. As a result, the longitudinal edges of the sheet 30 of packaging material are further folded downwardly in an overlapping manner, as shown in FIG. 4. Then, a pair of grooved heat seal rollers 44 disposed beneath the support surface 40 engage the overlapping edges of the sheet 30 of packaging material so as to create a continuous longitudinal fin seal 30a. The fin seal 30a is next engaged by a pair of pull rollers 46, also disposed beneath the support surface 40, which advance the folded sheet 30 of packaging material (and the articles 36 enclosed therein) through the apparatus 26. A deflector 40a is provided in the support surface 40 to fold the fin seal 30a upwardly into flush engagement with the folded sheet 30 of packaging material, as shown in FIG. 5.

A rotary crimping assembly, indicated generally at 48, is provided in the apparatus 26 for laterally crimping and cutting the folded sheet 30 of packaging material so as to form a plurality of individually sealed packages, such as shown at 36a in FIG. 3. The crimping assembly 48 includes an upper crimper bar 50 that is disposed above the support surface 40 for rotation about an axis extending generally perpendicular to the longitudinal movement of the sheet 30 of packaging material. A pair of upper crimpers, indicated generally at 52, are attached to opposite sides of the upper crimper bar 50 for rotation therewith. Similarly, the crimping assembly 48 includes a lower crimper bar 54 that is disposed below the support surface 40 for rotation about an axis extending generally perpendicular to the longitudinal movement of the sheet 30 of packaging material. A pair of lower crimpers, indicated generally at 56, are attached to opposite sides of the lower crimper bar 54 for rotation therewith.

FIGS. 6 through 10 illustrate a preferred embodiment of a split crimper 58 according to the invention. The split crimper 58 can be used as one or both of the upper crimpers 52 and/or as one or both of the lower crimpers 56 shown in the crimping assembly 48 shown in FIG. 3. Preferably, all of the upper and lower crimpers 50 and 54 are split crimpers 58 in accordance with this invention.

Figure 6:
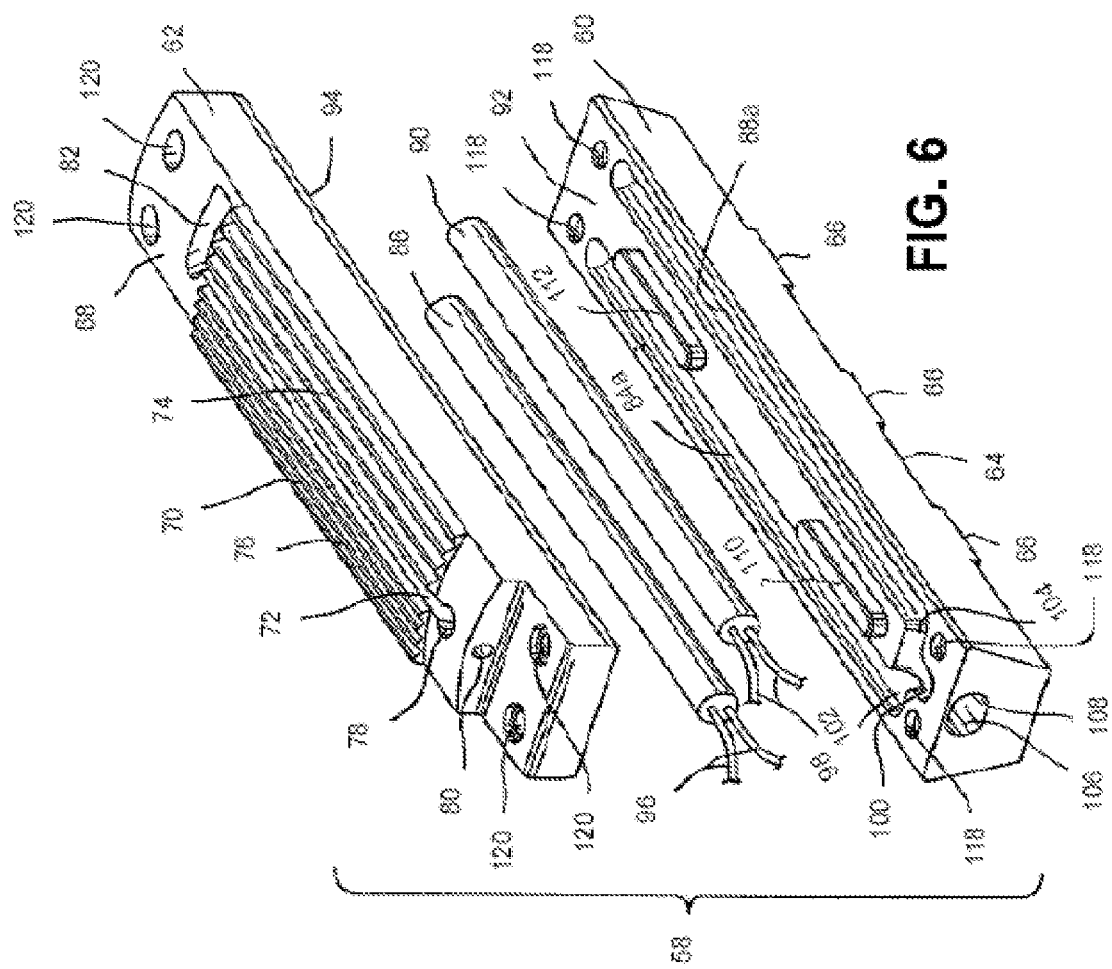
FIG. 6 is an exploded perspective view of a split crimper according to the invention, including two heating elements, that is adapted for use as part of the rotary crimping assembly of FIG. 3.
Figure 7:
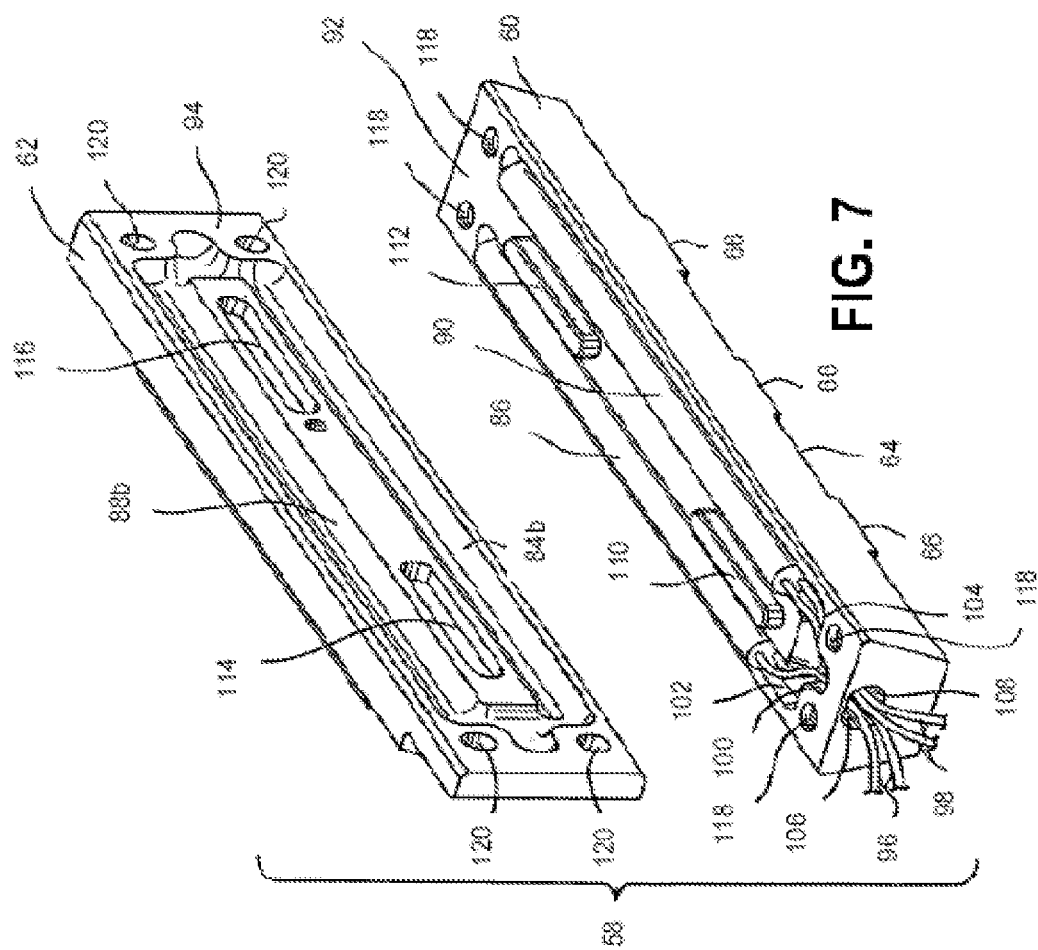
FIG. 7 is a perspective view of the split crimper of FIG. 6 showing the heating elements positioned inside the base of the crimper and showing the underside of the top of the crimper.
Figure 8:
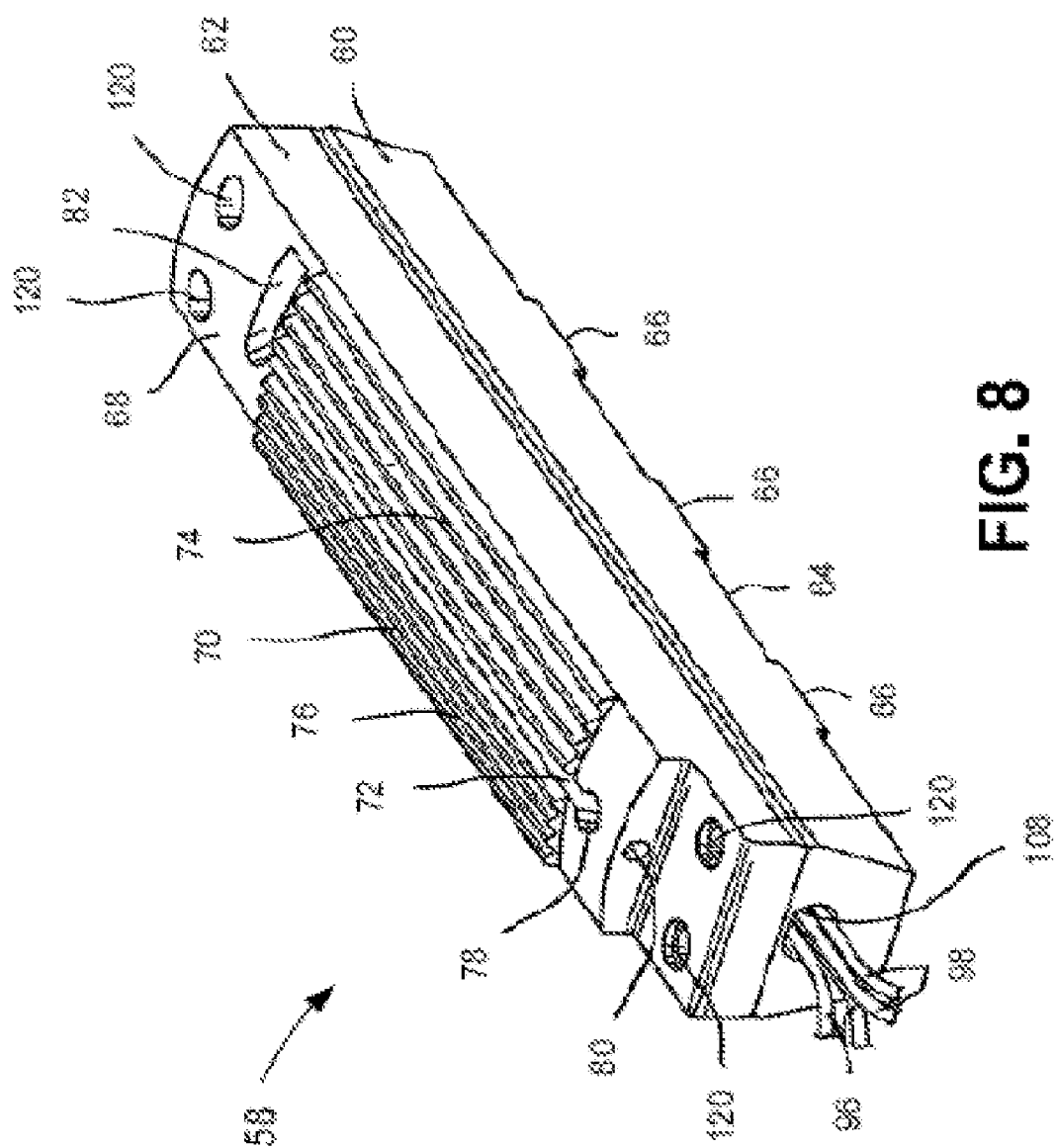
FIG. 8 is a perspective view of the split crimper of FIG. 7 showing the top of the crimper positioned on the base of the crimper and the heating elements inside the crimper.
Figure 9:
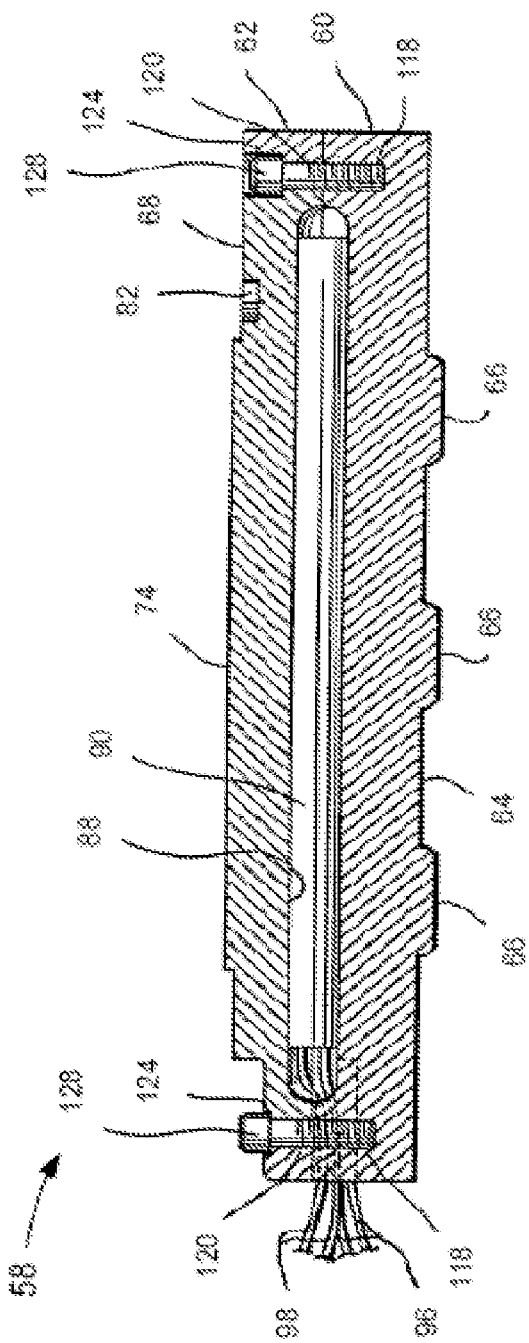
FIG. 9 is a side sectional view of the split crimper of FIG. 8 showing the top of the crimper attached to the base of the crimper and one of the heating elements inside the crimper.
Figure 10:
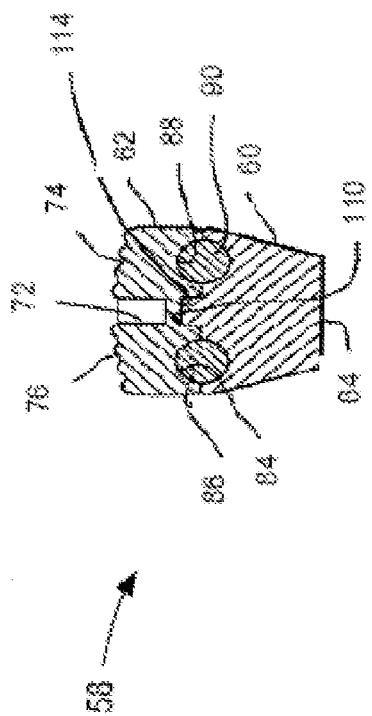
FIG. 10 is an end sectional view of the split crimper of FIGS. 8 and 9 showing the top of the crimper attached to the base of the crimper and both of the heating elements inside the crimper.

The split crimper 58 comprises two or more crimper portions that are removably attached to one another to form the crimper 58. In the illustrated embodiment, the split crimper 58 comprises a first crimper portion, which is a base 60, and a second crimper portion, which is a top 62. In an alternate embodiment (not shown), the split crimper could comprise left and right crimper halves. FIGS. 6 and 7 show the top 62 removed from the base 60, FIG. 8 shows the top 62 positioned on the base 60, and FIGS. 9 and 10 show the top 62 attached to the base 60. As illustrated in FIG. 8, the split crimper 58 is generally rectangular in shape and is somewhat elongated.

The base 60 of the split crimper 58 is adapted for attaching to the upper crimper bar 50. The base 60 extends along a portion of the upper crimper bar 50 and is secured thereto by any conventional means (not shown). The base 60 includes a lower surface 64 which abuts a mounting surface (not shown) provided on the upper crimper bar 50 when attached thereto. In the preferred embodiment shown, the lower surface 64 includes a plurality of spaced apart pads 66 that protrude from the lower surface 64. The pads 66 abut the mounting surface of the crimper bar 50 when the split crimper 58 is attached thereto, leaving the remaining areas of the lower surface 64 spaced apart from the mounting surface. This optional arrangement minimizes heat transfer between the split crimper 58 and the crimper bar 50 during the crimping operation. Alternatively, the lower surface 64 could be formed without the pads 66 or with different structures (not shown) to minimize heat transfer. If the mounting surface on the crimper bar 50 is rounded, the pads 66 can be formed to have a radius (not shown) which matches the contour of the mounting surface. In a preferred embodiment, the base 60 is attached to the upper crimper bar 50 by the use of threaded fasteners (not shown) extending from the crimper bar 50 into threaded holes (not shown) in bottom of the pads 66.

The top 62 of the split crimper 52 has an upper surface 68. The upper surface 68 includes a longitudinally extending, outwardly facing crimping surface 70. The crimping surface 70 is formed having any type of cross sectional shape suitable for performing the sealing operation, preferably an undulating cross sectional shape. The illustrated upper surface 68 also has a longitudinally extending slot 72 that extends along the center of the upper surface 68. The slot 72 divides the crimping surface 70 into a leading portion 74 and a trailing portion 76. A conventional cutting blade (not shown) or a conventional anvil (not shown) is disposed within the slot 72. The slot 72 has an enlarged end 78 that receives an enlarged end portion of the blade or anvil. An opening 80 that extends to the enlarged end 78 of the slot 72 allows the insertion of a threaded fastener (not shown) into a threaded hole in the enlarged end portion of the blade or anvil to secure it in place. A pry slot 82 is provided at the other end of the slot 72 to assist in removal of the blade or anvil from the slot 72. The purpose of the cutting blade and the anvil will be described below.

The base 60 and the top 62 of the split crimper 58 define at least one interior cavity 84 (see FIG. 10) that is adapted for totally enclosing a heating element 86. In the preferred embodiment shown, the base 60 and the top 62 define first and second interior cavities 84 and 88 (see FIG. 10) that are adapted for totally enclosing first and second heating elements 86 and 90, respectively. As shown in FIGS. 6 and 7, the first interior cavity 84 is defined by the combination of a first groove 84a in an inner surface 92 of the base 60 and a first groove 84b in an inner surface 94 of the top 62. The second interior cavity 88 is defined by the combination of a second groove 88a in the inner surface 92 of the base 60 and a second groove 88b in the inner surface 94 of the top 62. The first grooves 84a and 88a and the second grooves 88a and 88b are preferably longitudinally-extending and generally hemispherical in cross sectional shape. The resulting first and second interior cavities 84 and 88 are longitudinally-extending and generally cylindrically shaped and, as such, are adapted to totally enclose the cylindrically-shaped bodies of the first and second heating elements 86 and 90, respectively, when the top 62 is secured to the bottom 60, as shown in FIG. 8.

The heating elements 86 and 90 can be any type suitable for providing the required heat for sealing and suitable for fitting within the interior cavities 84 and 88. The power rating and dimensions of the bodies of the heating elements 86 and 90 will vary depending on the particular sealing operation and the particular structure of the crimper 58. In one embodiment, the heating elements 86 and 90 operate at thirty six volts and two hundred fifty watts, and have dimensions of 5/16 inch in diameter and 5⅝ inches in length.

The heating elements 86 and 90 have respective pairs of electrical wires 96 and 98 that extend from the ends of the bodies thereof to an electrical power circuit (not shown). The illustrated split crimper 58 has a passageway 100 provided therein for the passage of the electrical wires 96 and 98 from the heating elements 86 and 90 to the exterior of the crimper 58. The passageway 100 can have any structure suitable for this purpose. In the embodiment shown, the passageway 100 includes first and second branch passages 102 and 104 that extend to the first and second interior cavities 84 and 88, respectively. The branch passages 102 and 104 converge into a single passage 106 that extends to an opening 108 in the exterior of the crimper 58. In the preferred embodiment shown, the opening 108 is located in the base 60 of the crimper 58, but alternatively it could be located in the top 62, or partially in the top 62 and partially in the base 60. It should be noted that the junctions between the electrical wires 96 and 98 and the heating elements 86 and 90 are totally enclosed and protected by the crimper 58 when the top 62 is secured to the base 60.

When the split crimper 58 is assembled, the heating elements 86 and 90 are positioned inside the interior cavities 84 and 88. Then, the top 62 of the crimper 58 is positioned on the base 60. The split crimper 58 preferably includes cooperating structures on the base 60 and the top 62 to facilitate positioning them relative to one another. Any suitable structures can be used for this purpose. In the embodiment shown, the base 60 of the crimper 58 includes first and second keys 110 and 112 that protrude from its inner surface 92. The keys 110 are located between the first and second grooves 84a and 88a in the base 60. The top 62 of the crimper 58 includes first and second slots 114 and 116 in its inner surface 94. The slots 114 and 116 are located between the first and second grooves 84b and 88b in the top 62. When the top 62 is placed on the base 60, the keys 110 and 112 extend into the slots 114 and 116 to position the top 62 relative to the base 60.

The base 60 and the top 62 of the split crimper 58 can be formed from any suitable material. Preferably, they are formed from a strong, rigid metal, such as steel. The base 60 and the top 62 can be manufactured in any suitable manner. For example, the base 60 and the top 62 can each be manufactured by machining a blank of metal to include the above-described structures. The blanks for manufacturing the base 60 and the top 62 may be the same. Typically, once the crimping surface 70 is ground on the top 62, the top 62 becomes dedicated to either an upper crimper 52 or a lower crimper 56. For example, the top 62 may be a male upper top or a female lower top, or a right hand upper top or a left hand lower top. The base 60 is typically interchangeable between the upper crimper 52 and the lower crimper 56.

Figure 2:
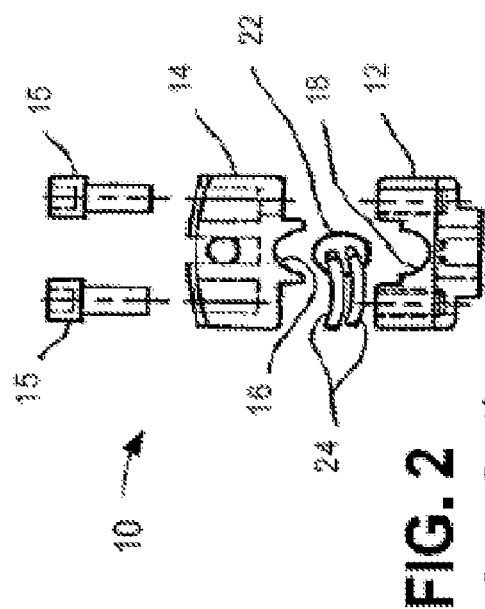
FIG. 2 is an exploded end elevational view of the crimper illustrated in FIG. 1.

The top 62 of the split crimper 58 is removably attached to the base 60 by any suitable retaining means. Preferably, the top 62 and the base 60 each have at least four holes adapted for receiving fasteners for removably attaching the top 62 to the base 60. In the preferred embodiment shown, the base 60 has four threaded holes 118 extending into the four corners of its inner surface 92. The top 62 has four unthreaded holes 120, with enlarged upper ends 124 (see FIG. 9), extending through its four corners. Four threaded fasteners 128 (two of which are shown in FIG. 9) are inserted into the aligned holes 118 and 120 until the heads of the fasteners 128 abut the bottom of the enlarged upper ends 124 of the holes 120. The use of four fasteners 128 in the four corners of the crimper 58 creates a strong, stable attachment between the top 62 and the base 60. It should be noted that the prior art crimper 10 shown in FIGS. 1 and 2 could not be modified to include both two heating elements and four fasteners, because the ends of the heating elements would extend through the corners of the crimper and thereby block the locations where the fasteners would be inserted.

Referring again to FIG. 3, in operation the upper and lower crimpers 52 and 56 are respectively attached to the upper and lower crimper bars 50 and 54 for rotation. Preferably, all of the upper and lower crimpers 52 and 56 are split crimpers 58 according to the invention, as shown in FIGS. 6 through 10. As the folded sheet 30 of packaging material is moved along the support surface 40 in the direction of the arrow, the upper crimpers 52 are rotated about the upper crimper bar 50 in a counterclockwise direction (as viewed from outside the drawing), and the lower crimpers 56 are rotated in a clockwise direction. As a result, the leading portions 74 of the crimping surfaces 70 (FIG. 8) of opposing upper and lower crimpers 52 and 56 initially engage the folded sheet 30 of packaging material. When this occurs, the folded sheet 30 is compressed between the downwardly facing crimping surface 70 of the upper crimper 52 and the upwardly facing crimping surface 70 of the lower crimper 56. As a result, the overlapping layers which make up the folded sheet 30 of packaging material are sealed together to form a trailing edge seal for a packaged article 36a.

One of the opposing upper and lower crimpers 52 and 56 can be equipped with a blade, and the other can be equipped with an anvil. Further movement of the folded sheet 30 of packaging material, and further rotation of the upper and lower crimpers 52 and 56, brings the crimpers 52 and 56 to a position where the blade is aligned with the anvil at a location after the trailing edge seal of the packaged article 36a. Consequently, the folded sheet 30 of packaging material is cut longitudinally into two pieces at this location.

Still further movement of the folded sheet 30 of packaging material, and further rotation of the upper and lower crimpers 52 and 56, brings the crimpers 52 and 56 to a position where the trailing portions 76 of the crimping surfaces 70 (FIG. 8) engage the folded sheet 30. When this occurs, the folded sheet 30 is compressed between the downwardly facing crimping surface 70 of the upper crimper 52 and the upwardly facing crimping surface 70 of the lower crimper 56. As a result, the overlapping layers which make up the folded sheet 30 of packaging material are sealed together to form a leading edge seal for the next packaged article 36a on the conveyor 38.

When either of the heating elements 86 or 90 requires replacement, the top 62 of the split crimper 58 is initially removed from the base 60 without disturbing the original set-up. This allows access to the heating element 86 or 90 for replacement. When the new heating element 86 or 90 is installed, the top 62 is repositioned on the base 60 and attached with the fasteners 128. Advantageously, the base 60 remains attached to the crimper bar 50 or 54 during the replacement of the heating element 86 or 90. As a result, it is unnecessary to perform a time consuming set-up operation on the split crimper 58 after replacing the heating element 86 or 90.

In accordance with the provisions of the patent statutes, the principle and mode of operation of this invention have been described in its preferred embodiment. However, it should be noted that this invention may be practiced otherwise than as specifically illustrated and described without departing from its scope. For example, the split crimper of this invention has been described and illustrated in the context of an otherwise conventional rotary crimping assembly. It will be appreciated, however, that the split crimper of this invention may be utilized in other types of conventional crimping assemblies, such as walking bar and intermittent crimping assemblies, wherein one or both of the crimpers are moved in such a manner as to engage and compress the packaging material therebetween. The above-described rotary crimping assembly includes upper and lower crimper bars that move the crimpers into engagement with the overlapping layers of packaging material to create a seal. However, other types of crimping assemblies may include other means for moving the crimpers into engagement with the layers of packaging material, in which case the split crimper would be adapted for attachment to that means. Although the opening 108 for passage of the electrical wires 96 and 98 is located in the base 60 of the illustrated split crimper 58, alternatively the opening 108 could be located in the top 62 of the split crimper 58. With such a design, the top 62 could be designed to be reversible on the base 60 so that the opening 108 ends up on a desired side of the crimping assembly regardless of which hand the assembly is.

What is claimed is:

1. A crimper for engaging and heat sealing overlapping layers of a packaging material, the crimper comprising:
    a first crimper portion that includes a crimping surface;
    a second crimper portion secured to the first crimper portion, where portions of the first and second crimper portions cooperate to define:
        a first interior cavity and a second interior cavity, where each of the first and second interior cavities includes a first longitudinally-extending length, and
        a first passageway and a second passageway, where:
            each of the first and second passageways that includes a second longitudinally-extending length that is shorter than the first longitudinally-extending length
            the first passageway extends from the first interior cavity to an exterior of the crimper, and
            the second passageway extends from the second interior cavity to the exterior of the crimper,
    where the second crimper portion includes a plurality of spaced pads that extend from and are integrally formed with a lower surface of the second crimper portion,
    where the plurality of spaced pads minimize heat transfer to a crimper bar connected to the second crimper portion,
    where each of the plurality of spaced pads includes a radius that matches a rounded contour of the crimper bar;
    a first heating element that includes:
        a first body, and
        a first wire extending from a first junction with the first body, where the first junction between the first body and the first wire is disposed completely within the first interior cavity and the first wire extends through the first passageway to the exterior of the crimper; and
    a second heating element that includes:
        a second body, and
        a second wire extending from a second junction with the second body, where the second junction between the second body and the second wire is disposed completely within the second interior cavity and the second wire extends through the second passageway to the exterior of the crimper.

2. The crimper of claim 1, where the first and second crimper portions include corresponding interior cavity portions that cooperate to define the first and second interior cavities.

3. The crimper of claim 1, where one of the first and second crimper portions includes an opening communicating with the first and second passageways and the first and second wires extend from the first and second junctions, respectively, through the opening.

4. The crimper of claim 1, where the first crimper portion is secured to the second crimper portion via four fasteners.

5. The crimper of claim 1, where
    the first body of the first heating element is disposed completely within the first interior cavity, and
    the second body of the second heating element is disposed completely within the second interior cavity.

6. The crimper of claim 5, where the first junction of the first heating element is protected by the first interior cavity.

7. The crimper of claim 6, where the second junction of the second heating is protected by the second interior cavity.

8. The crimper of claim 1, where the first and second crimper portions include cooperating structures that position the first and second crimper portions relative to one another.

9. The crimper of claim 8, where the cooperating structures include:
    a key provided on one of the first and second crimper portions, and
    a slot provided on the other of the first and second crimper portions.

10. The crimper of claim 8, where the cooperating structures include:
    a pair of keys provided on one of the first and second crimper portions, and
    a pair of slots provided on the other of the first and second crimper portions.

11. A crimping assembly for heat sealing overlapping layers of a packaging material, the crimping assembly comprising:
   a first crimper;
   a second crimper; and
   an apparatus for moving the first and second crimpers so that the first and second crimpers engage and compress the overlapping layers of the packaging material provided therebetween;
   where at least one of the first and second crimpers includes:
      a first crimper portion that includes a crimping surface,
      a second crimper portion secured to the first crimper portion, where portions of the first and second crimper portions cooperate to define:
         a first interior cavity and a second interior cavity, where each of the first and second interior cavities includes a first longitudinally-extending length, and
         a first passageway and a second passageway, where:
            each of the first and second passageways includes a second longitudinally-extending length that is shorter than the first longitudinally-extending length,
            the first passageway communicates with and extends from the first interior cavity to an exterior of the at least one of the first and second crimpers, and
            the second passageway communicates with and extends from the second interior cavity to the exterior of the at least one of the first and second crimpers,
      a first heating element that includes a first body and a first wire extending from a first junction with the first body, where the first junction between the first body and the first wire is disposed completely within the first interior cavity and the first wire extends through the first passageway to the exterior of the at least one of the first and second crimpers, and
      a second heating element that includes a second body and a second wire extending from a second junction with the second body, where the second junction between the second body and the second wire is disposed completely within the second interior cavity and the second wire extends through the second passageway to the exterior of the at least one of the first and second crimpers,
   where the second crimper portion includes a plurality of spaced pads that extend from and are integrally formed with a lower surface of the second crimper portion, the plurality of spaced pads minimize heat transfer to a crimper bar connected to the second crimper portion, and each of the plurality of spaced pads includes a radius that matches a rounded contour of the crimper bar.

12. The crimping assembly of claim 11, where:
   the first and second crimper portions include corresponding interior cavity portions that cooperate to define the first interior cavity and the second interior cavity,
   the first crimper portion is secured to the second crimper portion via four fasteners,
   the first body of the first heating element is disposed completely within the first interior cavity, and
   the second body of the second heating element is disposed completely within the second interior cavity.

13. The crimping assembly of claim 11, where the first and second crimper portions include cooperating structures that position the first and second crimper portions relative to one another.

* * * * *

UNITED STATES PATENT AND TRADEMARK OFFICE
CERTIFICATE OF CORRECTION

PATENT NO.         : 7,730,698 B1
APPLICATION NO.    : 11/305746
DATED              : June 8, 2010
INVENTOR(S)        : Louis M. Montano et al.

It is certified that error appears in the above-identified patent and that said Letters Patent is hereby corrected as shown below:

Column 8, line 2, after "passageways" delete the word "that".

Column 8, line 5, after "length" insert --,--.

Signed and Sealed this

Thirteenth Day of July, 2010

David J. Kappos
*Director of the United States Patent and Trademark Office*